Sept. 5, 1933.                C. T. CROCKER                  1,925,863
                   COMPENSATING MECHANISM FOR COMPASSES
                          Filed Sept. 16, 1929
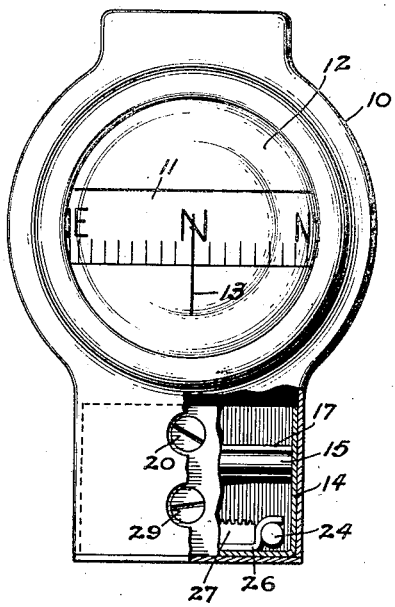
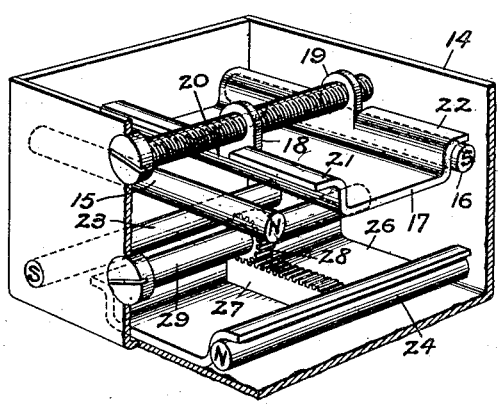
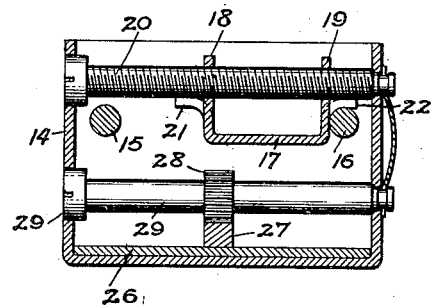
Inventor:
Clarence T. Crocker,
by Charles E. Tullar
His Attorney.

Patented Sept. 5, 1933

1,925,863

UNITED STATES PATENT OFFICE 1,925,863

COMPENSATING MECHANISM FOR COMPASSES

Clarence T. Crocker, Schenectady, N. Y., assignor to General Electric Company, a corporation of New York Application September 16, 1929
Serial No. 392,792

3 Claims. (Cl. 33—225)

This invention relates to compasses and the more particularly to magnetic compasses of the moving card type, such for example as those in general use upon ships and aircraft.

It is well known to persons skilled in that art that the presence of a stray magnetic field in the vicinity of the needle of a magnetic compass produces a distortion of the earth's field sufficient to cause the needle to deviate from the true position that it would normally occupy in the earth's field and thus give an erroneous indication to the observer. The distortion of the earth's field may be due to the presence of any magnetized body such for example as a permanent magnet, an electromagnet, etc., in the vicinity of the compass.

Accordingly an object of my invention is the provision of a simple, reliable and improved means for compensating and correcting for the effect of distortion of the earth's field in the vicinity of a magnetic compass; more particularly the provision of means for compensating for the distortion of the earth's field by an adjustable auxiliary field.

Although my invention is applicable to magnetic compasses in general, I have illustrated it as embodied in a magnetic compass the structure of which is particularly adapted for service on airplanes.

In carrying my invention into effect in one form thereof, I provide a pair of magnetic members arranged side by side in spaced relationship in a direction transverse to their magnetic axes, together with a third magnetic member arranged for relative movement with respect to the first two members for the purpose of varying their resultant magnetic effect and thereby introducing a desired compensation.

For a better and more thorough understanding of the invention, reference should now be had to the following specification and to the accompanying drawing in which Fig. 1 is a view in elevation of a magnetic compass of the type described above, with a portion of the housing broken away to reveal the compensating mechanism, Fig. 2 is a view in perspective of the compensating mechanism and its supporting framework and Fig. 3 is a sectional view thereof.

Referring now to the drawing, a compass housing 10 is provided with the usual compass needle and mounting (not shown) upon which the compass card 11 is suitably mounted. Since the particular type of needle and mounting for the needle form no part of the invention and since an illustration of these elements is not necessary to an understanding of the invention, they have accordingly been omitted from the drawing.

The compass card 11 is provided with the customary markings and scale graduations as shown and these may be viewed through a lens 12 suitably secured in the housing 10. As is usual the compass card may be read by means of a suitable cooperating index line 13 scratched or otherwise marked in any suitable manner upon the lens 12.

The lower part of the housing 10 is shaped in the form of a box to provide a compensating chamber adapted to receive a frame 14 in which the compensating mechanism is supported.

In order to overcome the error due to the effect of magnetized bodies in the neighborhood of the compass needle, two compensating units are mounted beneath the compass needle within the compensating chamber, i. e., the lower portion of the housing 10; one unit for providing fore and aft compensation and the other for providing athwartship compensation.

The frame 14 may be fabricated of any suitable light non-magnetic metal such for example as aluminum. As shown in the drawing two compensating units are mounted so as to occupy respective horizontal planes. The upper compensating unit comprises a pair of bar magnets 15 and 16 which are located in spaced relationship within the frame 14 to which they may be secured in any suitable manner such, for example, as by punch pricking the frame to cause the frame to retain the magnets. In order that the magnets 15 and 16 may provide oppositely directed magnetic effects, they are arranged opposite each other magnetically, i. e., the north pole of magnet 15 is adjacent the south pole of magnet 16. Preferably these two magnets are so mounted that their magnetic axes are substantially parallel.

The resultant magnetic effect of the magnets 15 and 16 is varied by means of a cooperating channel-shaped magnetic member 17 which is made of any suitable ferromagnetic material such, for example, as soft iron. It will be noted that the transverse dimension of the channel-shaped magnetic member 17 is less than the transverse distance between the magnetic axes of the magnets 15 and 16; thus permitting the member 17 to be moved back and forth in the space between the magnets and to optionally overlie the magnets. The magnetic member 17 is provided intermediately of its extremities with lugs or ears 18 and 19, which are threaded to engage an adjusting screw 20 which as shown is journaled in the supporting frame 14. Although the adjusting screw may be constructed of any suitable non-magnetic material, it is preferably made of brass. The walls of the channel-shaped magnetic member 17 are bent over to provide lips or flanges 21 and 22 having an arcuate-shaped cross section adapted to fit the magnets 15 and 16 snugly when the magnetic member 17 is moved to either limit of its travel by the adjusting screw 20. Since the magnetic member 17 is constructed of a ferromagnetic material, it will be clear to persons skilled in the art that when it is moved to one extremity of its travel with the flange 22 in engagement with magnet 16 as shown in Figs. 2 and 3 of the drawing that it will form a magnetic short circuit for that magnet, as a result of which the magnet 16 will be effectually screened or shielded.

The lower compensating unit, likewise consists of a pair of bar magnets 23 and 24 arranged in spaced relationship in the manner explained for magnets 15 and 16. These magnets are secured in the supporting frame 14 as explained above and are also arranged with the poles of one of the magnets adjacent the poles of unlike polarity of the other magnet. In addition it will be noted that the magnets 23 and 24 are arranged so that the projections of all four magnets upon a horizontal plane form the sides of a square. In order that these four magnets shall not form a closed magnetic loop and thus destroy the possibility of exerting a compensating effect, the lower pair of magnets 23 and 24 are so arranged with respect to the upper pair of magnets 15 and 16 that the poles of like polarity are adjacent each other e. g. it will be noted that the north pole of magnet 15 is directly above the north pole of magnet 24 and that the south pole of magnet 16 is directly above the south pole of magnet 24 and consequently the south and north poles of magnets 15 and 16 respectively are directly above the south and north poles of the magnet 23.

The lower compensating unit is similarly provided with a cooperating channel-shaped magnetic member 26 which like the member 17 is made of any suitable ferromagnetic material such as soft iron. As shown it rests upon the floor or bottom of the supporting frame 14 and may be moved back and forth between the magnets 23 and 24 by means of a rack 27 with which it is provided and a cooperating pinion 28 which is suitably secured on the adjusting screw 29; the adjusting screw 29 being journaled in the housing 14. The rack and pinion and adjusting screw are preferably made of some non-magnetic material such for example, as brass. It will be noted that by providing a screw to effect movement of the lower magnetic member 26 that movements of the members 17 and 26 at right angles to each other may be produced although the adjusting screws 20 and 29 are located in the same face of the housing 14.

With the above preliminary understanding of the elements comprising my invention and their association with each other, the manner in which these units are operated to correct errors due to permanently magnetized bodies in the vicinity of the compass will now be described.

As is well understood by persons skilled in this art the presence of a magnet, i. e. a magnetized body in the vicinity of the compass will set up a stray magnetic field. When the magnetic axis of this stray field lies at an angle with the axis of the earth's field, it may be resolved into two components, one parallel to the axis of the earth's field and one at right angles thereto. The component of this stray field which is at right angles with the earth's field will of course be east and west and this component will cause the north-south line on the compass card to deviate slightly from the axis of the earth's field either to the right or to the left depending upon whether the component at right angles with the earth's field is in the east-west direction or in the west-east direction. Assuming that the ship or airplane is pointed north, the effect of this cross component, however, may be balanced out by turning the adjusting screw 20 to displace the magnetic member 17 from its neutral position to a position in which it shields or screens either of the magnets 15 or 16. When the member 17 has been adjusted to cause the north marking on the compass card to register with the index line 13 the component at right angles to the earth's field will have been fully compensated.

When the ship is turned east and west the component of the stray field which in the former position of the ship was parallel to the axis of the earth's field will now be at right angles with the axis of the earth's field and therefore the lower compensating unit which provides compensation at right angles to the compensation provided by the upper unit must be manipulated in the manner described above to correct for this component of the stray field.

The manner in which displacement of the channel-shaped magnetic members 17 and 26 introduces a corrective component will now be explained. It will be clear to persons skilled in the art that when the magnetic member 17 is in a position midway between the magnetic axis of the magnets 15 and 16 that the magnetic effect of each of the two magnets balances each other and no corrective component is introduced. This is true because the magnets are mounted in opposite directions magnetically and the magnetic member 17 being in a central position between the two magnets it exerts no more of a screening effect upon one than upon the other. The rotation of the adjusting screw 20, however, serves to displace the magnetic member 17 from its central position toward one of the magnets and away from the other. If it be assumed that the member 17 is displaced toward magnet 16 it will be clear that the member 17 exerts more of a shielding or screening effect upon the magnet 16 than upon the magnet 15. Consequently the magnetic effect of the magnet 15 is caused to predominate over that of the magnet 16.

Had the member 17 been displaced in the opposite direction from its central position, i. e. toward the magnet 15 and away from the magnet 16, the magnet 15 would be screened by the member 17 and the magnet 16 would thus be caused to predominate and introduce a compensating component in a direction the reverse of that above described for the magnet 15. Thus it will be seen that a compensating unit is capable of introducing a compensating effect in opposite directions and that this effect may be varied in amount as desired by rotation of the adjusting screws. Since the two compensating units are so positioned that they introduce compensating effects at right angles to each other, it will be clear that the compensating mechanism above described is capable of compensating for the effect of any stray field in the vicinity of the compass both in a fore and aft and in an athwartship direction.

Although in accordance with the provision of the patent statutes I have described my invention as comprising particular elements associated with each other in a specific manner, I would have it clearly understood that the invention is not limited to the exact form or apparatus shown in the drawing since alterations and modifications will readily suggest themselves to persons skilled in the art without departing from my invention or the scope of the annexed claims.

What I claim as new and desire to secure by Letters Patent of the United States, is:

1. A compensating unit for a compass comprising a pair of magnets arranged in spaced relationship with their magnetic axes substantially symmetrically disposed on opposite sides of a central position and with the poles of one magnet adjacent the poles of unlike polarity of the other magnet, a cooperating channel shaped magnetic member arranged to move in a transverse axial direction in the space between said magnets, the walls of said channel-shaped magnetic member being provided with flanges adapted to optionally overlie said magnets, and means for varying the position of said member with respect to said magnets whereby the magnetic effect of one of said magnets is caused to predominate over that of the other.

2. A compensating unit for a magnetic compass comprising a pair of permanent magnets arranged in spaced relationship with the poles of one magnet adjacent the poles of unlike polarity of the other magnet, a cooperating channel shaped ferromagnetic member arranged with its longitudinal axis intermediate of the magnetic axes of the magnets, the walls of said channel shaped magnetic member being provided with flanges adapted to optionally overlie said magnets, and means for effecting a relative transverse movement between said magnets and said member to vary the magnetic effect of said magnets.

3. A compensating unit for a magnetic compass comprising a pair of bar magnets spaced from each other with the poles of one magnet adjacent the poles of unlike polarity of the other magnet, a channel shaped ferromagnetic member having its walls spaced apart less than the distance between said magnets and formed to provide flanges adapted to register with said magnets and means for effecting a relative transverse axial movement between said member and said magnets to effect shielding of one of said magnets by one of said flanges proportional to said movement, whereby the other of said magnets is caused to predominate to effect a desired compensating effect.

CLARENCE T. CROCKER.